(12) United States Patent
Gruber et al.

(10) Patent No.: US 8,979,386 B2
(45) Date of Patent: Mar. 17, 2015

(54) ROLLING ELEMENT BEARING HAVING REPLACEABLE SEAL

(75) Inventors: Andreas Gruber, Maria Buch-Feistritz (AT); Henning Kern, Schweinfurt (DE); Jochen Lorenscheit, Rimpar (DE); Edgar Pickel, Sommerach (DE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/989,635

(22) PCT Filed: Nov. 22, 2011

(86) PCT No.: PCT/EP2011/070651
§ 371 (c)(1),
(2), (4) Date: Aug. 5, 2013

(87) PCT Pub. No.: WO2012/069458
PCT Pub. Date: May 31, 2012

(65) Prior Publication Data
US 2013/0322803 A1  Dec. 5, 2013

(30) Foreign Application Priority Data
Nov. 25, 2010  (DE) .......................... 10 2010 061 932

(51) Int. Cl.
*F16C 33/76* (2006.01)
*F16C 23/08* (2006.01)
(Continued)

(52) U.S. Cl.
CPC .............. *F16C 33/76* (2013.01); *F16C 23/086* (2013.01); *F16C 33/7806* (2013.01); *F16C 33/783* (2013.01); *F16C 33/7853* (2013.01); *F16C 43/045* (2013.01); *F16C 2300/14* (2013.01); *F16C 2360/31* (2013.01)
USPC .......................................................... 384/484

(58) Field of Classification Search
CPC .. F16C 33/783; F16C 33/784; F16C 33/7843; F16C 33/785; F16C 33/7859; F16C 33/7853; F16C 33/7856; F16C 2300/14; F16C 2300/78; F16C 2300/7806; F16C 43/045
USPC ................. 277/353, 549, 551, 572, 575–577; 384/477, 481, 482, 484–486
See application file for complete search history.

(56) References Cited

U.S. PATENT DOCUMENTS 2,348,587 A * 5/1944 Antonelli ...................... 277/507
2,353,988 A * 7/1944 Batesole et al. .............. 277/380
(Continued)

FOREIGN PATENT DOCUMENTS

DE          1169214 B      4/1964
DE          8018794 U1    12/1980
(Continued)

*Primary Examiner* — Phillip A Johnson
(74) *Attorney, Agent, or Firm* — Bryan Peckjian; SKF USA Inc. Patent Dept.

(57) ABSTRACT

A rolling-element bearing includes a first bearing ring (2) and a second bearing ring (4) opposing the first bearing (2) in a radial direction (3). A sealing element (6) of the rolling-element bearing includes a radially-encircling seal support (8) extending in the radial direction (3) by a predetermined distance towards the second bearing ring (4). The seal support (8) is interference-fit and removably attached to an axial end side (9) of the first bearing ring (2). A sealing lip (10) is attached to the seal support (8) and extends from an end of the seal support (8) opposite the first bearing ring (2) in the radial direction (3) up to a mating surface (12), which is part of the second bearing ring (2).

19 Claims, 6 Drawing Sheets

(51) Int. Cl.
*F16C 33/78* (2006.01)
*F16C 43/04* (2006.01)

(56) References Cited

U.S. PATENT DOCUMENTS 4,763,905 A    8/1988   Zvonar
5,232,292 A *  8/1993   Stackling et al. ............. 384/484
5,340,124 A *  8/1994   Jankowski et al. ........... 277/402

FOREIGN PATENT DOCUMENTS

| | | |
|---|---|---|
| DE | 3114325 A1 | 10/1982 |
| DE | 20019899 U1 | 2/2001 |
| DE | 102009014923 A1 | 9/2010 |
| EP | 0509729 A1 | 10/1992 |
| JP | 2000230562 A | 8/2000 |

* cited by examiner

ROLLING ELEMENT BEARING HAVING REPLACEABLE SEAL

CROSS-REFERENCE

This application is the U.S. national stage of International Application No. PCT/EP2011/070651 filed on Nov. 22, 2011, which claims priority to German patent application no. 10 2010 061 932.9 filed on Nov. 25, 2010.

TECHNICAL FIELD

The present invention is concerned with sealed rolling-element bearings, and in particular with rolling-element bearings which include a flexibly configurable and removable sealing element.

RELATED ART

The known sealing concepts for rolling-element bearings can usually ensure a reliable protection of the rolling-element bearing against dirt and contamination.

Rolling-element bearings, and in particular large rolling-element bearings (large bearings having an outer diameter d>420 mm), are often sealed by so-called labyrinths, which are attached to adjacent parts such as for example housings and/or shafts, and are intended to prevent, by a serpentine geometry, the penetration of impurities into the to-be-sealed region or into the rolling-element bearing. In this seal variant, all intermediate spaces of the labyrinth and also of the rolling-element bearing are usually filled with grease or lubricant. In addition, a supporting V-ring can be used on or in the labyrinth. The sealing effect is additionally assisted by periodic re-lubrication. However, this gives rise to ongoing material and maintenance costs.

Alternatively, rolling-element bearings, and in particular large bearings are also sealed, up to now, by ground sealing rings. These are essentially radial shaft sealing rings, possibly including dust-protecting lips connected upstream, which are held in a defined position relative to the actual bearing by additional support pieces, e.g., made of cast metal. Such seals have a design individually tailored to the respective bearing arrangement, and are therefore not directly transferable to other rolling-element bearing sizes let alone other rolling-element bearing types. In addition, the support parts require a large mass, and thus a high weight to be moved during mounting.

The separation of the seal from the actual rolling-element bearing is common to the last-mentioned sealing concepts (segregation), wherein filling with lubricant can only occur in the mounted state. This substantially increases the risk of damage or contamination of the bearing during transport.

In addition, integrated sealing concepts are known, for example from the published German patent application DE 10 2007 036 891 A1, which are comprised entirely of an elastomer and embodied e.g. in bellows-type manner. The seals are fixedly connected to the bearing outer ring, and the elastomer extends up to the inner ring. However, in particular with larger bearing diameters, the functionality of the sealing system cannot, or can only inadequately, be ensured by the use of an elastomer. Due to the closed geometry of the sealing ring, an exchange of the seal without disassembling the entire rolling-element bearing is also not possible.

Generally, an exchange of the seal in the mounted state cannot take place in any of the previous concepts without adjacent parts of the bearing having to be removed in a complex and costly manner, or even the bearing itself having to be fully disassembled. In particular in applications wherein only restricted access to the to-be-serviced system exists, or wherein a complete disassembly of the system is not economically feasible, such as for example with wind turbines, such sealing concepts are of significant disadvantage.

There is therefore the need for rolling-element bearings including seals which are more flexible and simpler to handle.

SUMMARY

In the exemplary embodiments of the present invention, a rolling-element bearing, which includes two bearing rings that radially oppose each other, additionally comprises a sealing element. The sealing element comprises both a seal support and a sealing profile attached to the seal support.

The seal support is attached to an axial end surface of one of the two bearing rings, i.e. to the bearing inner ring or to the bearing outer ring. The seal support extends from the particular bearing ring in the radial direction towards the other bearing ring.

The sealing profile is in turn attached to the seal support, and extends from the seal support itself up to a mating surface on the opposing bearing ring, so that the sealing lip abuts on the mating surface. The attachment of the seal support itself to the end surface of the bearing ring is an interference-fit and is therefore detachable.

In some exemplary embodiments, the sealing element or its seal support is attached exclusively to an axial end surface so that, even in the installed state of the bearing, the seal can be separated from it again by releasing the interference-fit connection and can be removed. An integrated sealing concept is implemented, in that the sealing lip touches a mating surface on the opposing bearing ring, which is itself part of the bearing ring (i.e. for example formed one-piece with the bearing ring); the integrated sealing concept allows, despite the removability, pre-greased bearings to be delivered and the probability of damage or contamination of the bearing to thereby be reduced.

The seal can also be integrated into an existing rolling-element bearing or rolling-element bearing concept due to the structure of some exemplary embodiments of sealing elements. The structure of the sealing element, comprised of the seal support and the sealing lip attached thereto, makes possible the subsequent integration into virtually any rolling-element bearing, independent of design, bearing series, and diameter.

In some exemplary embodiments, the seal support is attached to the bearing outer ring of a rolling-element bearing, so that no additional moving masses need to be added to the rotating system, and the sealing function is nevertheless ensured.

In some exemplary embodiments, the mating surface on which the sealing lip abuts, or up to which the sealing lip of the sealing element extends, is itself formed by the raceway designed for the rolling elements. Depending on bearing type, the seal can thus be achieved with a minimal modification of the bearing. In other exemplary embodiments of rolling-element bearings, the contact surface is attached, with the same objective, to the rim of the particular bearing ring, i.e. to the rim of that bearing ring which opposes the bearing ring on which the seal support is attached.

In further exemplary embodiments, the seal support, which completely encircles radially parallel to the bearing ring, is segmented, i.e. is comprised of at least two separable segments. The separability of the segments makes it possible to remove or replace the seal, even in difficult installation locations, without having to disassemble the bearing itself or further components. One such case can for example be when the shaft is secured with a shaft nut, which could prevent an extraction of an unsegmented seal. In order to increase the stability of the assembly, the individual segments can be interference-fit or friction-fit connected to one another.

In further exemplary embodiments, the sealing lip is interference-fit connected with the seal support, so that the connection between sealing lip and seal support can also be detached. This can be used to optionally only remove the sealing lip from the seal support, and thus to carry out a replacement of the sealing element, i.e. the sealing lip, that has been subjected to wear.

According to some exemplary embodiments, the seal support, which can be comprised of a mechanically rigid, inflexible material, is dimensioned such that it extends towards the opposing bearing ring over more than half of the distance between the two bearing rings. This ensures the required stiffness, in particular with larger bearings having diameters of 300 mm, 420 mm and more, so that the sealing effect is ensured even in such large bearings. Otherwise, with the use of a flexible material, the sealing lip could lift off of the mating surface due to the large diameter and to the inertial or centrifugal forces that occur during operation, and the sealing function is thereby impaired.

By the simple removal of the seal support, the friction-fit and thus detachable connection between the seal support and the bearing ring additionally makes possible a visual and tactile testing of the wear-relevant regions of the rolling-element bearing, such as for example the raceways, the rolling elements, or the cage. When using a segmented seal support, this is possible even in confined space conditions, since a removal of the seal support can occur even there. Among other things, the removability also makes it possible to take targeted grease samples for lubricant analysis, since all significant regions of the bearing can be made openly accessible. An exchange of the grease lubrication of the bearing can also take place due to the removed seal.

In alternative exemplary embodiments, the seal support may have at least one open bore extending in the axial direction through the seal support. This bore can be used as a grease outlet bore, to which used lubricant can be efficiently and discharged in a guided manner, for example via hoses or via directly screwed-on collection bottles. Among other things, contamination of the components disposed in the space surrounding the bearing can thereby be prevented.

The described exemplary embodiments of sealing elements make it possible to use rolling-element bearings in applications having long required service lives, such as for example in wind turbines.

In addition to the above-described advantages, by using a described sealing element, the space to be filled by lubricant is significantly reduced in comparison to labyrinth seals. In normal operation, a continuous lubricant exchange can also be omitted, which leads to the reduction of the maintenance and operating costs. In addition, the weight of the components required for the sealing is substantially reduced as compared with a labyrinth. For example, in wind turbines in which rolling-element bearings are used in generators or rotor drive shafts, this leads to a significant cost reduction in the overall system, since on the one hand the mounting can take place more efficiently and faster, and on the other hand the statics of the entire system must be designed only for a lower weight. In particular in such mounting-unfriendly conditions (the mounting often occurs outdoors and the maintenance occurs at a height of tens of meters), the possible pre-greasing of the bearing also reliably prevents contamination during the mounting and a damaging of the bearing resulting therefrom.

Some exemplary embodiments of the present invention will be explained below with reference to the accompanying Figures.

DETAILED DESCRIPTION OF THE INVENTION

Figures 1, 2, 3:
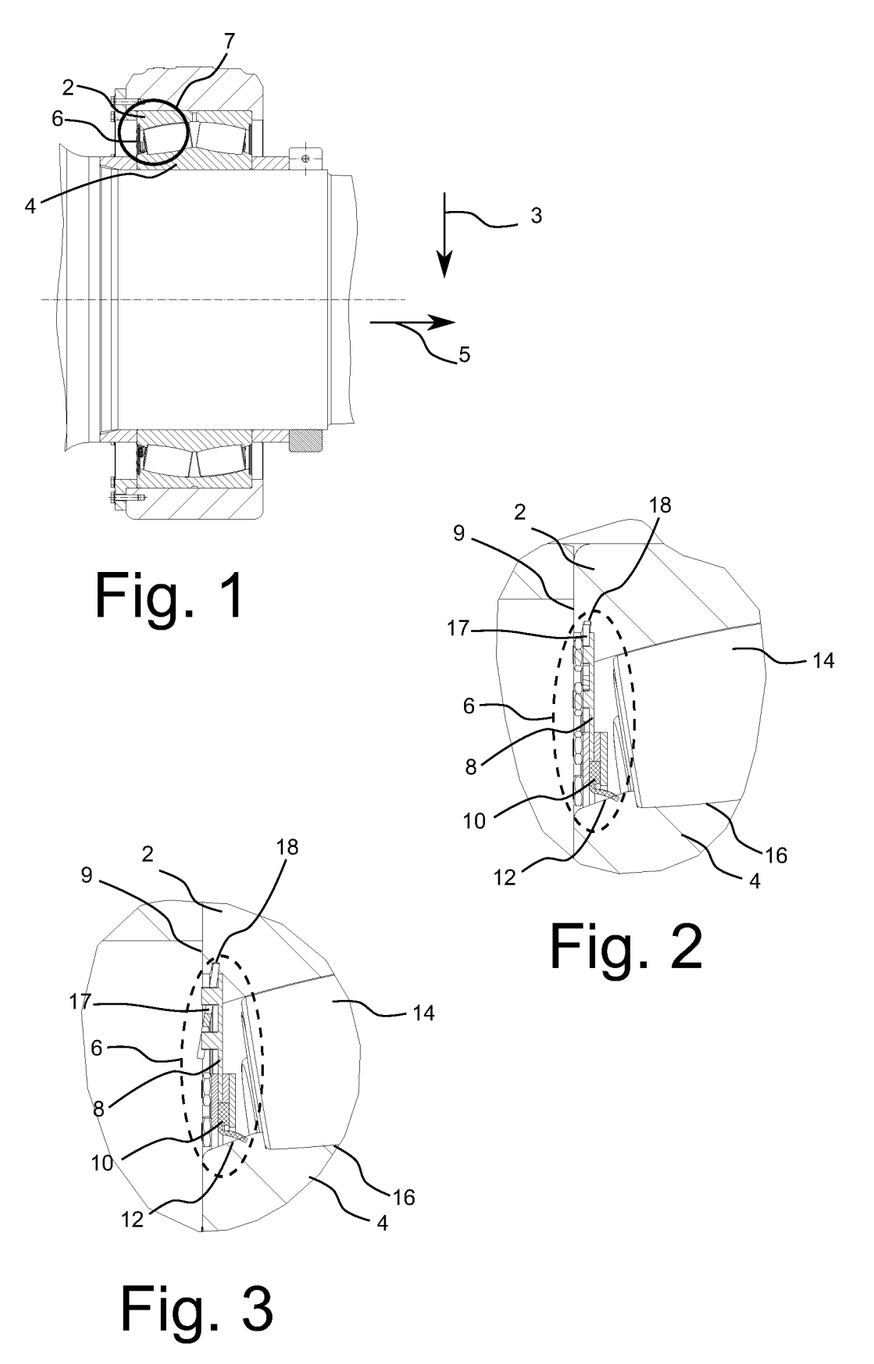
FIG. 1 shows a sectional view of an exemplary embodiment of a rolling-element bearing in the installed state.
FIG. 2 shows an enlarged detail of an exemplary embodiment of a rolling-element bearing.
FIG. 3 shows a further enlarged detail of the exemplary embodiment of FIG. 2.

FIG. 1 shows an exemplary embodiment of a rolling-element bearing according to the present teachings in the installed state, in order to generally illustrate the installation state of the sealed rolling-element bearing. Although only double row barrel roller bearings are shown in FIG. 1 as well as in the subsequent enlarged details of exemplary embodiments of rolling-element bearings according to the present teachings, it is self-evident that in alternative exemplary embodiments, all rolling-element bearing types, for example tapered roller bearings, cylindrical roller bearings, needle bearings, ball bearings, etc. can be used.

The rolling-element bearing shown in FIG. 1 comprises a first bearing ring 2 as well as, radially opposing it, a second bearing ring 4. Without limiting the universality, in the exemplary embodiment shown in FIG. 1, the first bearing ring 2 is the bearing outer ring, and the second bearing ring 4 is the bearing inner ring. Following the usual notation, "radial direction 3" is understood to be all directions perpendicular to the axis of rotation (of the axial direction 5). In the following, "extending in the radial direction" refers to each direction parallel to a radial direction, i.e. in particular both in the direction from the inner ring outwards and from the outer ring inwards.

In addition to a conventional rolling-element bearing, the exemplary embodiment of a rolling-element bearing shown in FIG. 1 includes a sealing element 6, which seals the bearing and which is only schematically represented in the scale chosen in FIG. 1. The sealing element is comprised of a seal support that is interference-fit connected to an axial end surface of the bearing outer ring 2, and a sealing profile attached thereto, which extends from the seal support up to a mating surface on the bearing inner ring 4. For the explanation of the details of various exemplary embodiments of rolling-element bearings including sealing element 6, reference is made to the following Figures, which each show enlarged details of the circular detail 7 marked in FIG. 1 for various exemplary embodiments of rolling-element bearings. This applies in particular to FIGS. 2, 3, 6, and 7.

As is visible in FIG. 2, the sealing element 6 is comprised of a seal support 8 as well as a sealing lip 10 attached to the seal support 8. In the present case, the sealing profile is thus designed in the form of a sealing lip 10. The seal support 8 can be formed one-piece as well as multipart. The seal support 8 is friction-fit attached to an axial end surface 9 of the bearing outer ring 2, so that after the connection to the bearing outer ring 2, this seal support 8 is removable again at any time. The seal support 8 extends in the radial direction 3 from the bearing outer ring 2 by a predetermined distance towards the bearing inner ring 4. In some exemplary embodiments, the seal support 8 is comprised of a rigid, inflexible material, and thus seals the upper part of the bearing shown in FIG. 2 without flexible seal materials. The material can be any rigid material, for example a metal or a plastic. The sealing lip 10 is in turn attached to the seal support 8 and extends from the side of the seal support 8 facing away from the bearing outer ring 2 up to a mating surface 12, which is part of the bearing inner ring 2. In the present exemplary embodiments, "extend" means that the sealing lip 10 touches the mating surface 12, so that a sealing function is fulfilled by the sealing lip 12, since the inner part of the bearing is sealed by the sealing element 6 from the external environment.

In the present case, the sealing lip 10 is friction-fit connected to the seal support 8. Here, as exemplarily shown in FIG. 2, the sealing lip 10 is pressed using a counter-plate or a ring and the illustrated nut against the seal support 8, in order to fix the sealing lip 10 in its position, and simultaneously to make it possible for the sealing lip to be able to be removed again from the seal support 8. Of course, other connections between sealing lip 10 and seal support 8 are possible in further exemplary embodiments. Thus the connection can for example also be made in a materially-bonded or friction-fit manner by adhering, vulcanizing, clamping, crimping, or similar connection methods. Thus, in principle, the connection of metal plate parts to one another (in the case of a multi-part seal support 8) and to the sealing profile or the sealing lip 10 can be formed in an interference-fit, friction-fit, or materially-bonded manner using known connection techniques such as screw-fastening, welding, clamping, etc.

Other forms of sealing profiles 10 can also be used in alternative exemplary embodiments. The term "sealing profile" here stands thus generally for any type of sealing material or of geometric shapes by which a sealing effect can be achieved. Polyurethane can for example be used as a material. Likewise, cross-sections of sealing profiles 10 other than shown in FIG. 2 also can be used. In some exemplary embodiments, for example an annular, radially encircling sealing lip 10 is used, or sealing profiles having other cross-sections, for example square, rectangular, elliptical, triangular or the like, are used. In contrast to the drawing shown, the sealing lip 10 or the sealing profile can also be formed in a mirror-inverted manner, which makes possible a grease discharge from the inside to the outside over the sealing lip 10. This assembly can be used where wear of the sealing lip 10 is expected, for example, due to heavily contaminated environmental conditions.

To ensure the ability to disassemble the bearing in the installed state, the seal support 8 is attached to an axial end surface 9 of the bearing outer ring 2. That is, the attachment is effected such that it can be detached from the side of the bearing even in the installed state. For example, in some exemplary embodiments, the sealing lip 8 is not permitted to extend beyond the axial end surface 9, and for example also is not permitted extend in the axial direction beyond the outer diameter of the bearing outer ring, as this would prevent a detachment of the connection in the installed state. "Attached to an axial end surface 9" thus means, for example, that the seal support 8 can be placed in the axial direction 5 on the side of the bearing outer ring 2, without being hindered by the bearing outer ring 2 or other structures on the bearing outer ring 2. In the exemplary embodiment shown in FIG. 2, the attachment of the seal support 8 to an axial end surface 9 is carried out such that the mounted seal support 8 terminates flush with the remaining end surface of the bearing outer ring 2. In alternative exemplary embodiments, however, the attached seal supports 8 can protrude in the axial direction 5 beyond the remaining end surface of the bearing, which end surface is not covered by the seal support 8, without impairing the function.

For the sake of completeness, the rolling elements 14, in this case barrel rollers, and the raceway 16 of the bearing inner ring 4 are also shown. The mating surface 12, i.e. the surface relative to which the sealing lip 10 is moved and which fulfills the sealing function, is attached on the rim of the bearing inner ring 4 in the exemplary embodiment shown in FIG. 2, or is formed by this rim. In alternative embodiments, the mating surface can also be formed directly by the raceway 16, provided it extends far enough to the edge of the bearing. In further exemplary embodiments, the mating surface can also be formed by the end surface of the bearing inner ring 4, i.e. it consists of an axial end surface of the bearing inner ring 4, or can be formed by it.

In other words, a sealing ring is fitted between the seal support 8 and the bearing inner ring 4, so that the rolling-element bearing inner ring 4 acts as the mating surface for the sealing lip. The attachment of this ring can be effected in a detachable manner by clamping, adhering, snap-fitting, or the like. In FIG. 2 the attachment is exemplarily shown as a re-detachable screw-fastening, which presses or clamps the seal ring between an additional clamping ring and the seal support.

Viewing FIGS. 2 and 3 together makes clear how the interference-fit connection between the seal support 8 and the bearing outer ring 2 is ensured in the discussed exemplary embodiment of the invention. This is effected in the present case using a clamping element 17 which engages in a groove 18 in the bearing outer ring 2. During the mounting, as is indicated in FIG. 3, once the seal support 8 has been positioned relative to the bearing outer ring 2, the clamping element 17 is inserted into the groove 18 and is screwed to the seal support 8 using the nuts or screws shown in FIG. 2. Due to the positioning of, and the shape of, the groove 18, the seal support 8 is attached to the axial end surface 9 of the bearing outer ring 2 via the clamping element 17 which is interference-fit connected to the seal support 8, and can be detached again at any time. In order to ensure a secure retention of the seal support 8 on the bearing outer ring 2, a plurality of such clamping elements 17 can be provided in a radially encircling manner.

Figure 4:
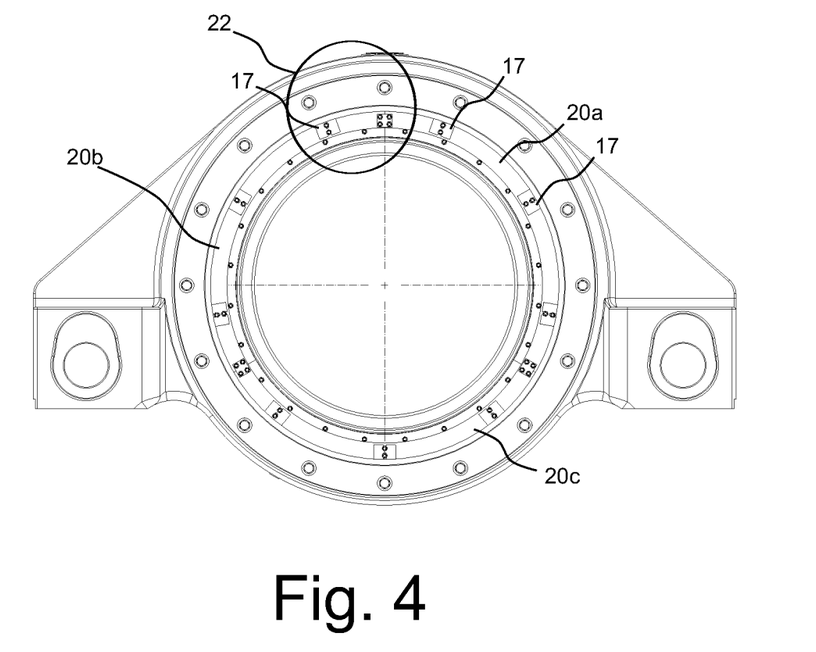
FIG. 4 shows a view of the rolling-element bearing of FIG. 2 in the installed state.

FIG. 4 shows a plan view in the axial direction 5 of an exemplary embodiment of a rolling-element bearing, wherein the seal support 8 is attached by clamping elements 17 to an axial end surface 9 of the bearing outer ring 2 as was just described. As is visible from FIG. 4, a plurality of clamping elements 17 are attached in a radially encircling manner. In alternative exemplary embodiments, a clamping element 17 can also be designed larger-scale, extending parallel to the bearing outer ring 2, for further stiffening or for better transmission of force. In the exemplary embodiment shown in FIG. 4, the connection of the seal support 8 to the bearing outer ring 2 of the rolling-element bearing is thus effected via the illustrated clamping elements 17, which can also be formed large-scale for stiffening the seal support 8. Using the clamping elements 17, the connection to the rolling-element bearing is produced via the engagement in a groove 18 in the outer ring 2 of the rolling-element bearing. In some further exemplary embodiments, an additional sealing element, for example a sealing ring, can be fitted between the bearing outer ring 2 and the inner side of the seal support 8, if the sealing function of the seal retainer 8, which is pressed against the bearing outer ring 2, is not sufficient without an additional sealing element.

Figure 5:
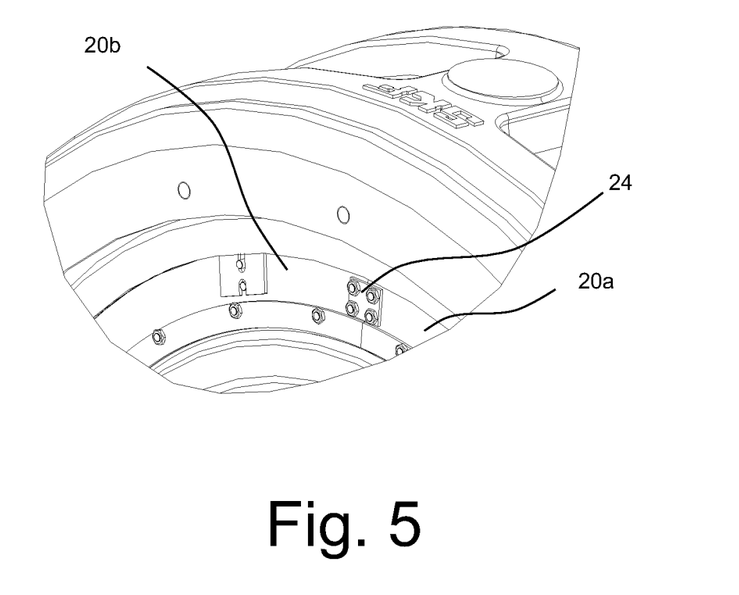
FIG. 5 shows an enlarged detail of the view of FIG. 4.

The seal support 8 can be manufactured from one piece or can be comprised of a plurality of segments, as is shown in an exemplary manner in FIG. 4. In FIG. 4, 3 segments 20a, 20b, and 20c are shown, which make it possible, even in difficult installation locations, to detach the seal support 8 from the bearing outer ring 2, and to remove or replace the seal or the sealing element 6. In some exemplary embodiments having the segmented seal support 8, the connection between the individual segments can be additionally strengthened by connecting plates or other interference- or friction-fit connections. As is visible from the enlarged detail of the region 22 pointed out in FIG. 4, which is shown in FIG. 5, the connection is produced in the exemplary embodiment shown in FIG. 4 using a connecting plate 24, which is screw-fastened to the abutting segments 20a and 20b of the seal support 8.

Figure 6:
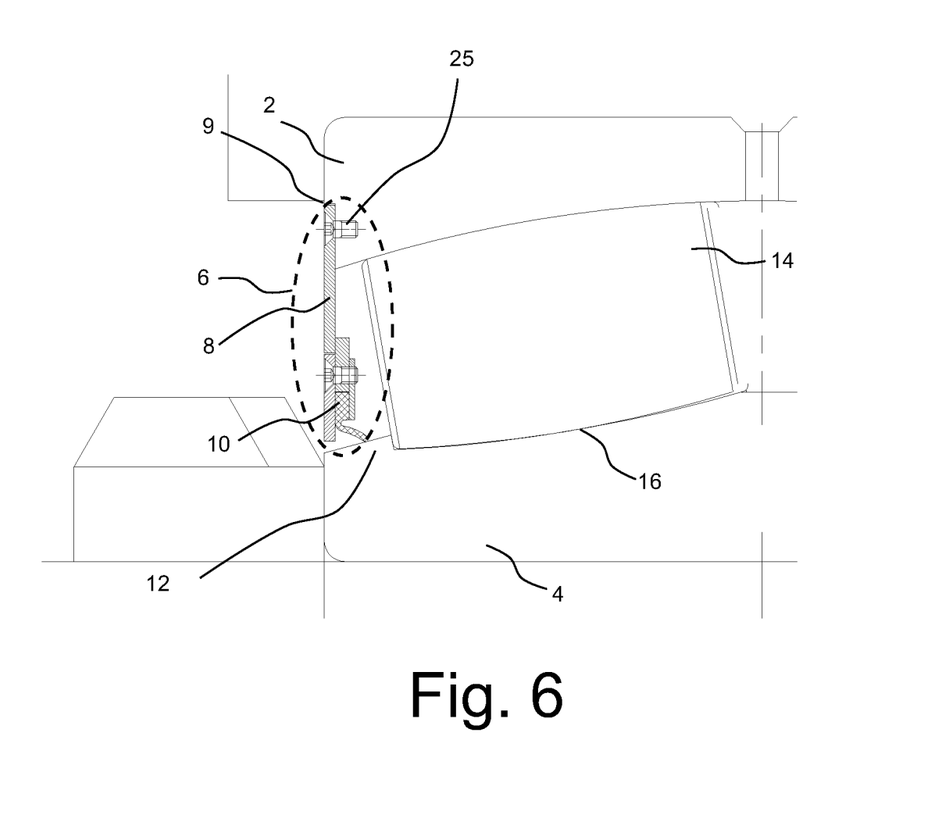
FIG. 6 shows an enlarged detail of a further exemplary embodiment of a rolling-element bearing.
Figure 7:
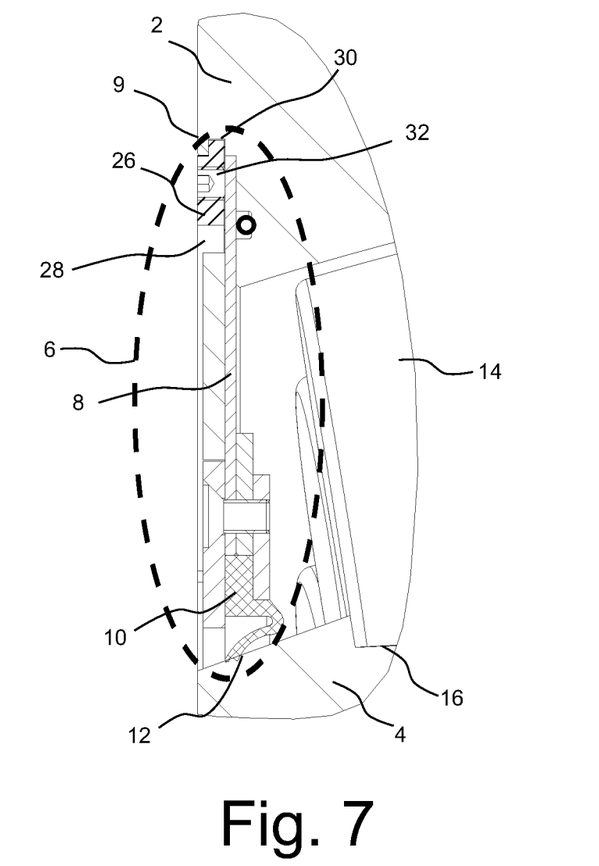
FIG. 7 shows an enlarged detail of a further exemplary embodiment of a rolling-element bearing.

FIGS. 6 and 7 show further exemplary embodiments of rolling element bearings, which differ from the exemplary embodiment discussed in the foregoing with regard to the design of the sealing element 6. The other elements, such as the bearing outer ring 2, bearing inner ring 4, rolling elements 14, and raceway 16 of the bearing inner ring correspond to those previously discussed, so that the following discussion can be limited to the differences to the exemplary embodiment discussed with reference to FIG. 2.

In the exemplary embodiment shown in FIG. 6, the seal support 8 is not clamped, but rather is directly screw-fastened to the bearing outer ring 2 or its axial end surface 9 using a screw 25, in order to ensure the removability of the sealing element 6.

Figure 8:
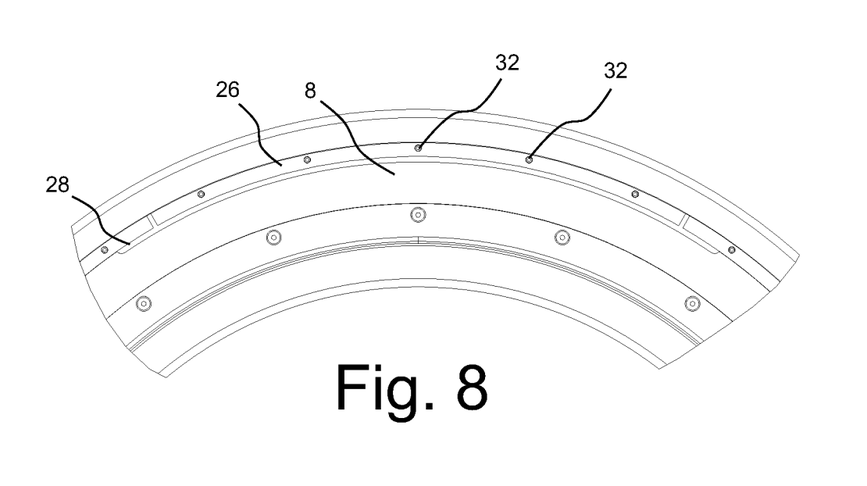
FIG. 8 shows a detail of a view of the rolling-element bearing of FIG. 7.

In the exemplary embodiment shown in FIG. 7, the seal support 8 is connected to the bearing outer ring 2 via an arc-shaped clamping element 26, which engages in a groove 30 in the bearing outer ring 2. The arc-shaped clamping element 26, which is also shown in the detail of the assembled bearing shown in FIG. 8, is first placed on the already-positioned seal support 8 within a recess 28 of the seal support 8, and is then moved radially outward into the groove 30 in the outer ring 2. In this position, the arc-shaped clamping element 26 can be clamped, for example using a headless set screw or a conventional screw, by screwing the screw or the headless set screw into a thread 32 in the arc-shaped clamping element 26, so that pressure is exerted on the seal support 8. As shown in FIG. 8, the recess 28 does not need to form a complete circle. FIG. 8 shows that the recess 28 only extends around a segment which is larger than the segment size of the arc-shaped clamping element 26. Thus, this clamping element 26 can be inserted in the position shown in FIG. 8. After insertion, the clamping element 26 can be moved to the left or right relative to the seal support 8, so as to provide space for a further clamping element. In this way, all clamping elements can be successively inserted and subsequently screw-fastened. In the exemplary embodiment shown in FIG. 8, with appropriate geometric dimensioning, the clamping element 26 can be additionally used to center the seal support 8 relative to the bearing.

In the exemplary embodiments shown in FIGS. 7 and 8, the orientation of the sealing lip 10 is different than in the previously discussed exemplary embodiments. Here the sealing lip 10 points outward in the axial direction, while in other exemplary embodiments it points inward in the axial direction. The assembly of FIG. 7 makes possible a controlled grease discharge so that, for example, an ongoing lubricant exchange and thus a cleaning of the bearing can take place despite the existing sealing function. Alternatively, in further exemplary embodiments sealing profiles can also be used which have no preferred direction or are symmetrical.

Figure 9:
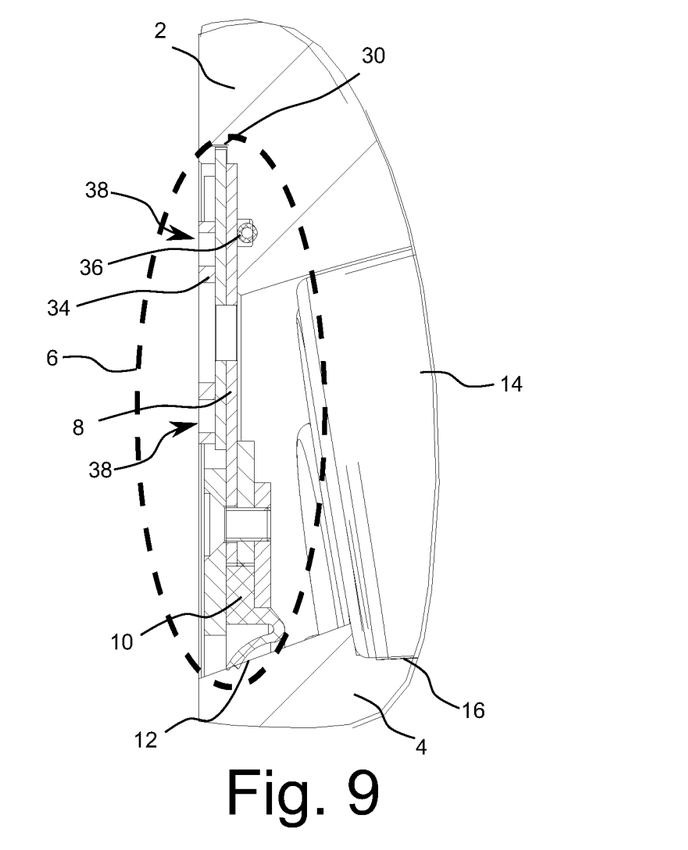
FIG. 9 shows a further exemplary embodiment of a rolling-element bearing.

FIG. 9 shows a further exemplary embodiment of a rolling-element bearing, wherein the seal support 8 is pressed onto the end surface of the bearing outer ring 2 using a bayonet mount 34 and is fixed thereby. In the sectional view shown in FIG. 9, the bayonet mount 34 is in the engaged state, wherein the bayonet mount 34 engages in a groove 30 on the outer ring 2 and thereby presses the seal support 8 against a seal 36 as well as against the end surface of the bearing outer ring 2.

Figure 10:
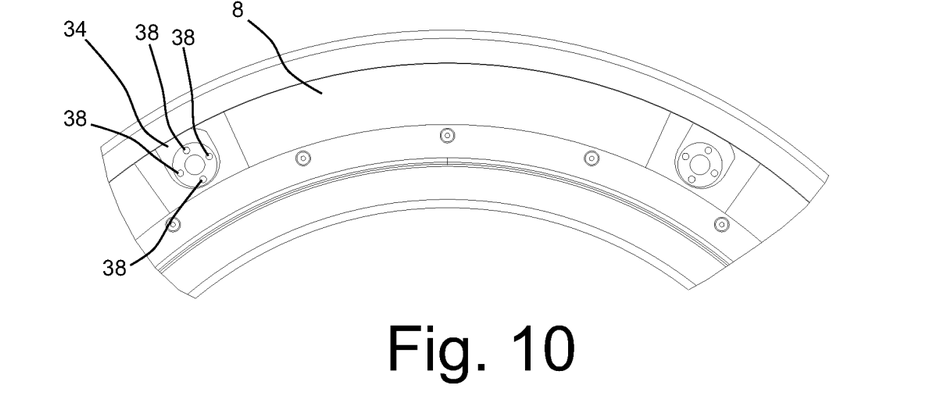
FIG. 10 shows a detail of a view of the rolling-element bearing of FIG. 9.

FIG. 10 shows a plan view of the exemplary embodiment of FIG. 9, in which the operation of the bayonet mount 34 is illustrated. The bayonet mount 34 has four grips for a tool; the bayonet mount 34 can be moved or turned relative to the seal support 8 by using the tool. Using a suitable tool, the bayonet mount 34 can for example be turned counterclockwise to release the connection, so that the engagement of the bayonet mount 34 in the groove 30 is released and the seal support 8 can be removed. Here the seal support 8 can be formed one-part, i.e. in a one-piece, completely radially-encircling manner, as well as multipart.

Figure 11:
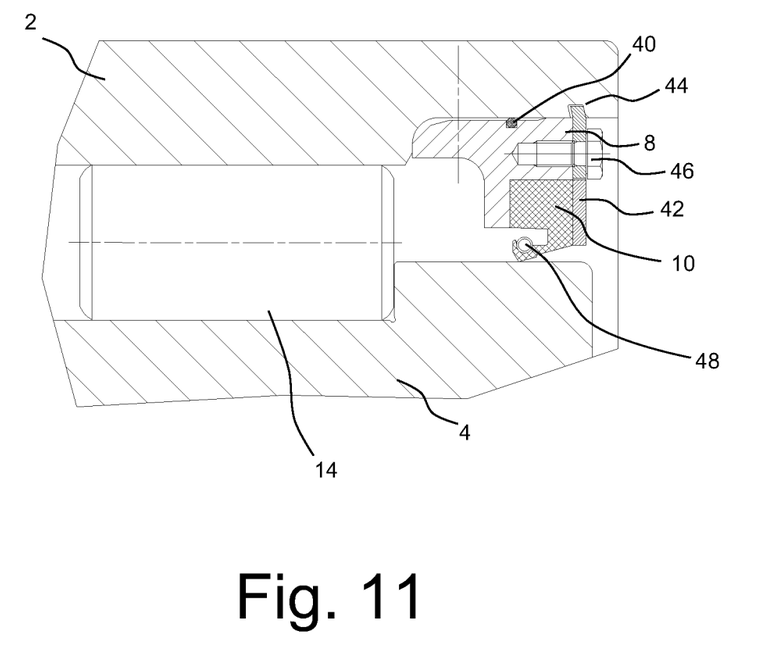
FIG. 11 shows a further exemplary embodiment of a rolling-element bearing, wherein cylindrical rollers are used as rolling elements.

FIG. 11 shows a further exemplary embodiment, wherein tapered rollers are used as rolling elements 14. Due to the different bearing geometry and the different bearing type, the shape of the seal support 8 of course differs from the shape of the seal support of the previous exemplary embodiments. Nevertheless, the seal support 8 here also extends in the radial direction from a first bearing ring 2 to a second bearing ring 4. For the purpose of sealing, a further seal 40 is provided here between the seal support 8 and the bearing outer ring 2. The seal support 8 is fixed to the outer ring 2 using a clamping plate 42, which engages in a groove 44 on the outer ring 2. The sealing profile 10 is fixed to the seal support 8 using the same clamping plate 42, so that in the present case, using a single screw 46, a releasable connection can be produced both between the sealing profile 10 and the seal support 8 and between the seal support 8 and the bearing outer ring 2.

As a further optional feature, FIG. 11 shows a radially-encircling reinforcing element 48 or a radially encircling garter spring, in order to increase the contact force of the sealing profile 10 on the mating surface 12, and thus to increase the sealing effect.

REFERENCE NUMBER LIST

2 First bearing ring
3 Radial direction
4 Second bearing ring
5 Axial direction
6 Sealing element
7 Detail
8 Seal support
9 Axial end surface
10 Sealing profile
12 Mating surface
14 Rolling elements
16 Raceway
17 Clamping element 18 Groove
20a,b,c Segment
24 Connecting Plate
25 Screw
26 Arc-shaped clamping element
28 Recess
30 Groove
32 Thread
34 Bayonet mount
36 Seal
38 Grip
40 Further seal
42 Clamping plate
44 Groove
46 Screw
48 Radially-encircling reinforcing element

The invention claimed is:

1. A rolling-element bearing, comprising:
   a first bearing ring;
   a second bearing ring opposing the first bearing ring in a radial direction and having a mating surface;
   a sealing element having a radially-encircling seal support extending in the radial direction by a predetermined distance towards the second bearing ring and a sealing profile attached to the radially-encircling seal support and extending from an end of the radially-encircling seal support opposite the first bearing ring in the radial direction up to the mating surface; and
   at least one clamping element detachably attaching the radially-encircling seal support to an axial end side of the first bearing ring, the radially-encircling seal support further being interference-fit to the first bearing ring,
   wherein the sealing profile is interference-fit connected to the radially-encircling seal support and the interference-fit connection is located in the radial direction at a half-way point of a radial gap facing towards the second bearing ring, the radial gap being located between the first bearing ring and the second bearing ring.

2. The rolling-element bearing according to claim 1, wherein the first bearing ring is an outer ring of the rolling-element bearing, and the second bearing ring is an inner ring of the rolling-element bearing.

3. The rolling-element bearing according to claim 2, wherein the first bearing ring has a diameter larger than 300 mm.

4. The rolling-element bearing according to claim 3, wherein:
   the mating surface is formed by a raceway of the second bearing ring, the raceway supporting a plurality of rolling elements,
   the radially-encircling seal support is comprised of at least three separable segments,
   the radially-encircling seal support is comprised of a rigid, inflexible material,
   the sealing profile includes a flexible sealing lip contacting the mating surface, and
   the at least one clamping element is engaged in a groove defined in the first bearing ring.

5. The rolling-element bearing according to claim 4, wherein:
   the at least one clamping element comprises a plurality of clamping elements that are engaged in the groove defined in the first bearing ring and are screw-fastened to an axial end of the first bearing ring, and
   connecting plates are respectively screw-fastened to abutting segments of the radially-encircling seal support.

6. The rolling-element bearing according to claim 2, wherein the mating surface is formed by a raceway of the second bearing ring, the raceway being designed for supporting rolling elements.

7. The rolling-element bearing according to claim 6, wherein the radially-encircling seal support is comprised of at least two separable segments.

8. The rolling-element bearing according to claim 7, wherein the sealing profile is interference-fit or friction-fit connected to the radially-encircling seal support.

9. The rolling-element bearing according to claim 7, wherein the radially-encircling seal support is comprised of a rigid, inflexible material.

10. The rolling-element bearing according to claim 9, wherein the radially-encircling seal support has at least one open bore extending in an axial direction through the radially-encircling seal support.

11. The rolling-element bearing according to claim 10, wherein the first bearing ring has a diameter larger than 300 mm.

12. The rolling-element bearing according to claim 2, wherein the mating surface is located on a rim or on an axial end side of the second bearing ring.

13. The rolling-element bearing according to claim 1, wherein the mating surface is formed by a raceway of the second bearing ring, the raceway being designed for supporting rolling elements.

14. The rolling-element bearing according to claim 1, wherein the mating surface is located on a rim or on an axial end side of the second bearing ring.

15. The rolling-element bearing according to claim 1, wherein the radially-encircling seal support is comprised of at least two separable segments.

16. The rolling-element bearing according to claim 1, wherein the radially-encircling seal support is comprised of a rigid, inflexible material.

17. The rolling-element bearing according to claim 1, wherein the radially-encircling seal support has at least one open bore extending in an axial direction through the radially-encircling seal support.

18. A rolling-element bearing, comprising:
   a first bearing ring;
   a second bearing ring opposing the first bearing ring in a radial direction and having a mating surface;
   a sealing element having a radially-encircling radially-encircling seal support extending in the radial direction by a predetermined distance towards the second bearing ring and a sealing profile attached to the radially-encircling seal support and extending from an end of the radially-encircling seal support opposite the first bearing ring in the radial direction up to the mating surface; and
   at least one clamping element detachably attaching the radially-encircling seal support to an axial end side of the first bearing ring, the radially-encircling seal support further being interference-fit to the first bearing ring,
   wherein the first bearing ring is an outer ring of the rolling-element bearing, and the second bearing ring is an inner ring of the rolling-element bearing,
   wherein:
      the mating surface is formed by a raceway of the second bearing ring, the raceway supporting a plurality of rolling elements,
      the radially-encircling seal support is comprised of at least three separable segments,
      the radially-encircling seal support is comprised of a rigid, inflexible material, the sealing profile includes a flexible sealing lip contacting the mating surface, and the at least one clamping element is engaged in a groove defined in the first bearing ring.

19. The rolling-element bearing according to claim 18, wherein:

the at least one clamping element comprises a plurality of clamping elements that are engaged in the groove defined in the first bearing ring and are screw-fastened to an axial end of the first bearing ring, and connecting plates are respectively screw-fastened to abutting segments of the radially-encircling seal support.

* * * * *